J. H. LONDICK.
LIQUID DISPENSING APPARATUS.
APPLICATION FILED JULY 11, 1918.
1,308,547.
Patented July 1, 1919.
2 SHEETS—SHEET 2.
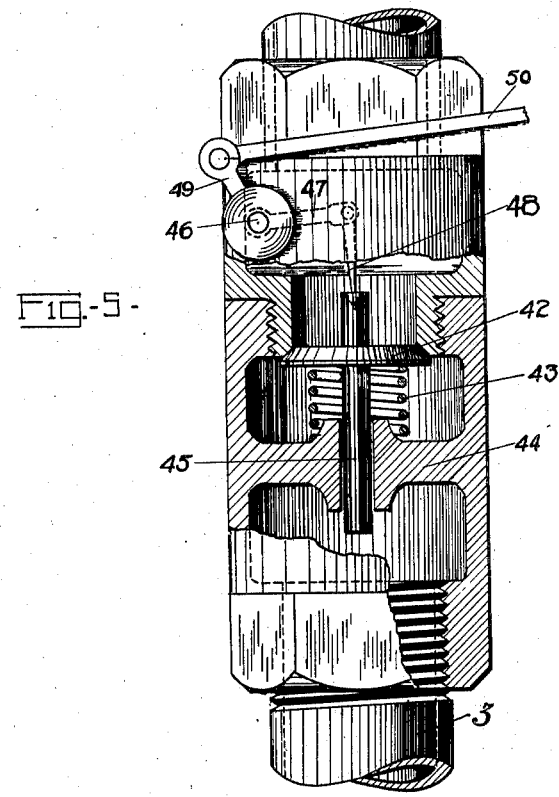
FIG.-5-
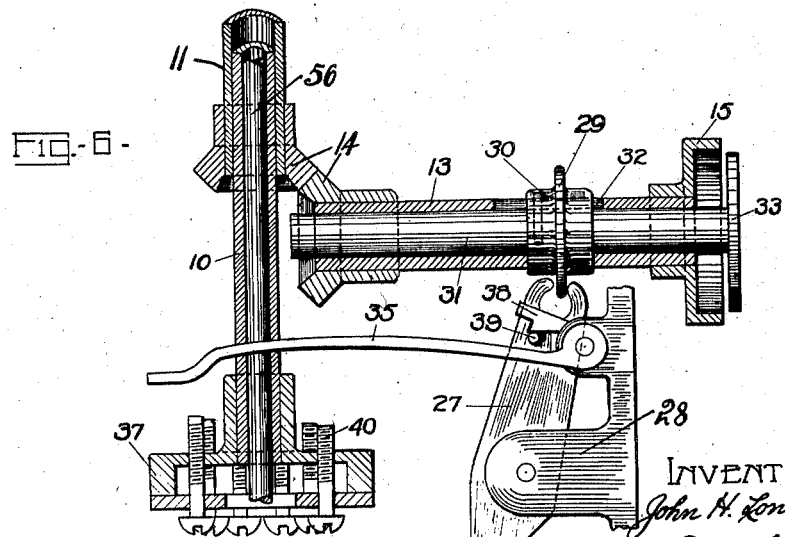
FIG.-6-
INVENTOR.
John H. Londick,
By Owen, Owen & Crampton,
His attys.

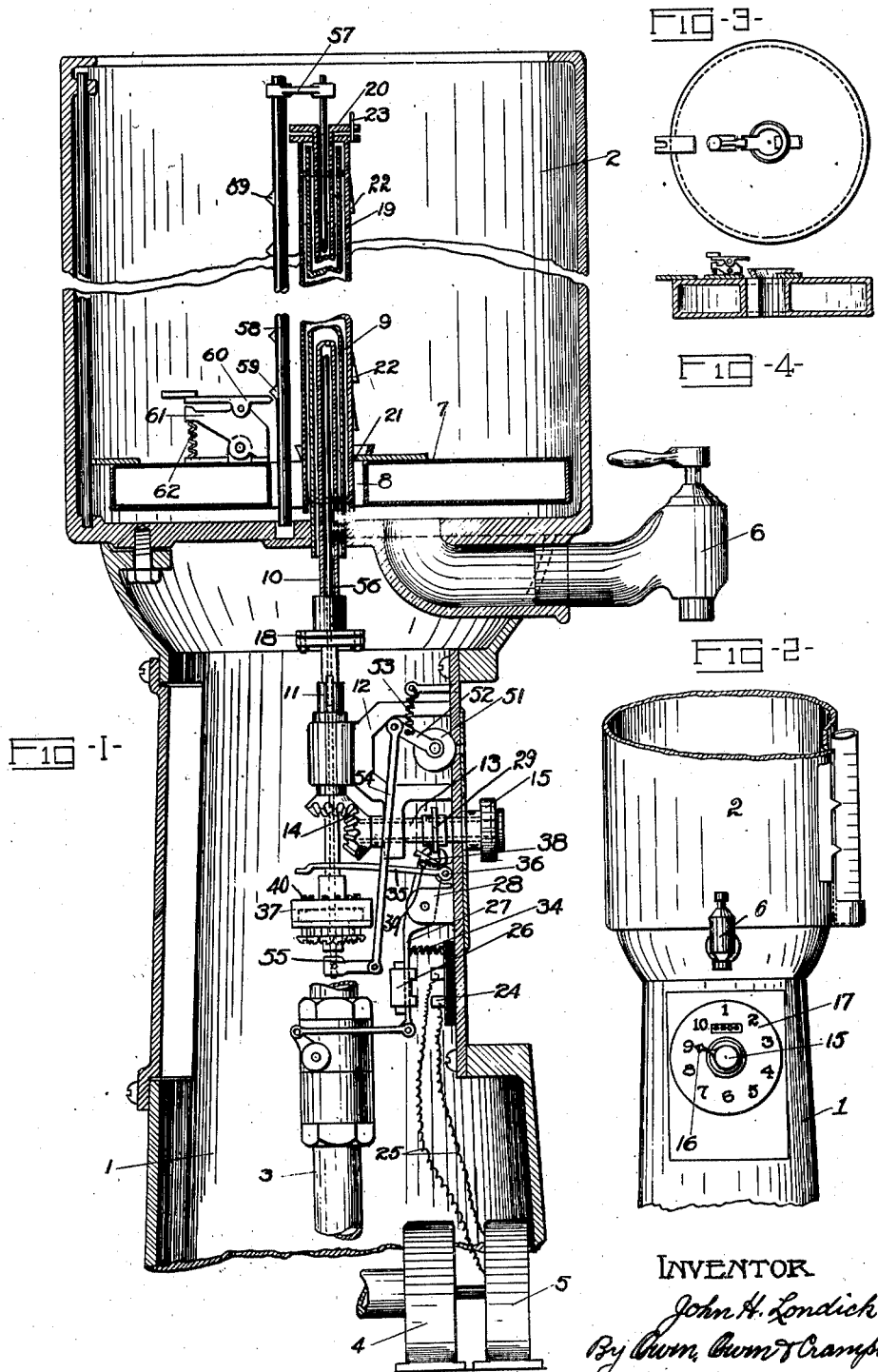

UNITED STATES PATENT OFFICE.

JOHN H. LONDICK, OF TOLEDO, OHIO.

LIQUID-DISPENSING APPARATUS.

1,308,547.  Specification of Letters Patent.  Patented July 1, 1919.

Application filed July 11, 1918. Serial No. 244,483.

*To all whom it may concern:*

Be it known that I, JOHN H. LONDICK, a citizen of the United States, and a resident of Toledo, in the county of Lucas and State of Ohio, have invented a certain new and useful Liquid-Dispensing Apparatus; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to liquid dispensing apparatus and particularly to those of the measuring type.

The object of my invention is the provision of a simple, efficient and improved apparatus of the character described which is adapted to be set to dispense any desired quantity of liquid therefrom and is automatically operable to stop the discharge of liquid into the dispensing receptacle when a predetermined or desired quantity of liquid for which the apparatus is set has been delivered to the dispensing receptacle. Further objects and advantages of the invention will be apparent from the following detailed description thereof.

While the invention is capable of embodiment in numerous forms, a preferred embodiment thereof is illustrated in the accompanying drawings, in which,—

Figure 1 is a central vertical longitudinal section of an apparatus embodying the invention with parts broken away and removed. Fig. 2 is a reduced side elevation of a portion thereof. Figs. 3 and 4 are plan and vertical sectional views of the float member. Fig. 5 is an enlarged elevation of a portion of the liquid supply line with a part broken away to disclose the shut-off valve, and Fig. 6 is an enlarged detail of a portion of the mechanism which is operable to determine the quantity of liquid fed to the dispensing receptacle, with parts in longitudinal section.

Referring to the drawings, 1 designates a hollow standard supporting at its top a liquid dispensing receptacle 2 of any desired capacity and to which a liquid supply pipe 3 leads, having communication with the receptacle at any convenient point therein. This pipe extends from any suitable source of liquid supply and has a pump 4 of any suitable type interposed therein and driven by an electric motor 5. A discharge faucet 6 is provided at the bottom of the receptacle 2.

A float 7 is provided in the receptacle 2 to rise and fall with the liquid therein. This float has a vertical opening 8 through its center and rising through said opening from the bottom of the tank is a tubular standard 9, which extends upward to near the top of the receptacle with its upper end open to the receptacle. The standard 9 is fixed at its lower end to the receptacle bottom and extends or opens downward therethrough. A hollow shaft 10 extends through the standard 9 for both rotary and longitudinal movements therein and has its lower end extending through and splined in a sleeve 11, whereby the shaft is caused to turn with said sleeve and is permitted to have axial movements relative thereto. The sleeve 11 is journaled in a bearing bracket 12 and is connected at its lower end to a control shaft 13 by a pair of miter gears 14. The hollow shaft 13 is horizontally disposed and journaled in the bracket 12 and wall of the standard 1 with its outer end projecting without said wall and carrying a small thumb wheel 15 to facilitate a hand turning of the shaft. The shaft 13 is also provided at its outer end with a pointer or index finger 16 adapted to be turned into register with one of a set of figures on a dial 17, designating the number of gallons or other desired units of measurement to be dispensed. It will be understool that a turning of the shaft 13 will impart like rotation to the sleeve 11 and shaft 10. The shaft 10 is provided with a detachable coupling 18.

A sleeve 19 is mounted over the tubular standard 9 for reciprocatory movements and extends at its lower end loosely through the opening 8 of the float 7 to near the bottom of the receptacle 2 and has its upper end extending above the standard 9 and flanged to coöperate with a flange 20 on the upper end of the shaft 10 to raise said shaft when the sleeve 19 is raised. The raising of the sleeve 19 is effected during an upward movement of the float 7 by the engagement of a finger 21 on the float with a vertically registering stop 22 on the sleeve 19. A plurality of such stops are provided on the outer side of the sleeve 19 in spirally arranged, vertically spaced order. The stops 22 correspond in number to the unit designations on the dial 17, and any one of the stops may be placed in tripping register or vertical register with the float finger 21 by a turning of the control shaft 13, which shaft is connected to the sleeve 19, in the present instance, by a pin 23. For instance, if the dial is set for nine gallons, the trip finger 21 on the float will engage the ninth stop 22 in order, when the float has been raised sufficiently for such purpose, and the further upward movement of the float will then cause an upward movement of sleeve 19 and shaft 10 therewith and stop the pumping of liquid into the tank 2, as hereinafter described.

An electric switch 24 is in circuit with the lead wires 25 of the motor 5, and the movable bridging member 26 of the switch is carried by the lower arm of a lever 27, which is fulcrumed to a bracket 28 on the inner side of the standard 1 below the shaft 13. The upper end of the lever 27 is forked and loosely straddles a circumferential flange 29 on a sleeve 30, which is mounted on the shaft 13, for sliding movements lengthwise thereof. A rod 31 extends axially through the shaft 13 for longitudinal movements therein and the sleeve 30 is pinned to said rod through a longitudinally extending slot 32 in the shaft 13. The outer end of the rod 31 is provided at the outer side of the thumb wheel 15 with a push disk or enlargement 33. The movements of the switch lever 27 are lengthwise of the shaft 13 and it is evident that an inward movement of the push rod 31 will move the sleeve 30 with it and impart a switch closing movement to the lever 27 thereby starting the operation of the motor and pump. A spring 34 acts against the switch lever 27 and normally maintains the switch open and the push rod 31 in its outward position.

A trip arm 35 is pivoted to the bracket 28 at 36 above the pivot of the switch lever 27 and has its free end extending over a trip head 37 that is carried at the lower end portion of the shaft 10. A catch arm 38 is fixedly carried on the pivot 36 with the arm 35 and coöperates with said arm to form a lever, whereby both arms 35 and 38 are caused to have rocking movements in unison. The switch lever 27 is provided at its upper end with a pin or shoulder 39 on which the catch arm 38 rests, and when the switch lever is in switch closing position the catch arm 38 is adapted to have catch engagement with the pin 39 and to coöperate therewith to hold the switch lever in said position. The dropping of the catch arm 38 into catch engagement with the pin 39 permits a lowering of the trip arm 35 into close proximity to the trip head 37 whereby an upward float-actuated movement of the shaft 10 will move said head to impart a tripping movement to the arm 35 sufficient to disengage the catch arm 38 from the pin 39 and permit the switch lever 27 to return, under the action of the spring 34, or by any other suitable means, to its open or circuit breaking position. The trip head 37, in the present instance, has a plurality of adjusting screws 40 threaded upward therethrough in encircling relation to the shaft 10 and in position for some one of said screws to engage the trip arm 35 when in lowered position and to effect a raising thereof when the shaft 10 is raised and in any position of its rotary adjustment. A screw 40 is provided for each stop 22 on the sleeve 19.

The supply line 3 is provided at a convenient point between the pump 4 and receptacle 2 with a check valve 42, which closes in the direction of flow of liquid through said line and is normally retained seated by a spring 43 which is interposed between said valve and a spider 44 in the line. The movements of the valve 42 are guided by a stem 45 projecting through a guide opening in said spider. A rock shaft 46 is mounted in one side portion of the line 3 adjacent to the upper or seating side of the valve 42 and has an arm 47 fixedly projecting therefrom into the line passage, transversely thereof, and pivotally carrying a thrust finger 48, which extends lengthwise of the line passage with its free end in thrust engagement with the valve 42, whereby a rocking of the arm 47 toward the valve 42 will effect an unseating of the valve. A rocker arm 49 is fixed to the rock shaft 46 without the line 3 and has connection with the lower end of the switch lever 27 through a rod 50. The connection between the switch lever and valve 42 is such that a movement of the lever to switch closing position will effect an opening of the valve and a movement of the switch lever to open position will permit a closing of the valve. It is thus evident that the valve 42 will close and the flow of liquid to the receptacle be instantly stopped upon an opening of the motor switch.

A meter 51 for recording in gallons or other units of measurement, the total quantity of liquid dispensed from the receptacle 2 at successive operations, is located within the standard 1 in convenient position, in the present instance, to be read through an opening in the dial face 17. The operating arm 52 of this meter is normally held in raised position by a spring 53 and a link 54 extends downward from the free end of said arm and connects at its lower end to an arm 55, which fixedly projects laterally from the lower end of a rod 56. This rod projects up through the shaft 10 for reciprocatory movements relative thereto and is provided at its upper end above said shaft with a fixed laterally projecting arm 57. A rod 58 fixedly depends from the outer end of the arm 57 down within the receptacle 2 to near the bottom thereof and through the opening 8 in the float 7, in the present instance at the side of said opening opposed to the finger 21. The rod 58 has a series of vertically spaced V-shaped projections 29 on its outer side with which a catch lever 60 engages during the rising and falling movements of the float 7. This lever is pivotally carried, in the present instance, by a second lever 61, which is pivotally carried by the float 7 on its top and is yieldingly held in one position of its movement by a spring 62. Upon an upward movement of the float the catch lever 60 is freely rocked by its engagement with its projection 59 as it passes the same without disturbing the position of the lever 61 relative to the float. Upon the downward movement of the float the lever 61 is engaged by each projection 59 in such manner as to necessitate a rocking of the lever 61 against the tension of the spring 62 to permit the lever 60 to pass the engaged projection. The resistance afforded by the spring 62 to such rocking of the levers 60 and 61 is sufficient to cause a lowering of the rod 58, therewith, until stopped by contact with the bottom of the receptacle 2 or other obstruction. The downward movement of rod 58 communicates an operating movement to the meter arm 52 to record the unit of liquid dispensed. The projections 59 are of such number and so arranged as to coact with the catch lever 60 and effect an operating of the meter arm 52 as each gallon or other unit of measurement for which the apparatus is set, is dispensed from the receptacle 2.

In the operation of my dispensing apparatus the operator turns the thumb wheel 15 to place the index finger 16 into register with the number indicating the quantity of liquid to be dispensed. This turning of the wheel 15 also rotates the shaft 10 and sleeve 19 to place the desired stop projection 22 into vertical register with the float finger 21. The operator then pushes the rod 31 inward and thereby throws the switch lever 27 into switch closing position thus starting motor 5 and pump 4 which latter pumps liquid into receptacle 2 through the supply line 3. It will be understood that the movement of the switch lever to switch closing position opens the supply line valve 42 and that such valve is maintained open until the switch lever has moved to open position. When the switch lever 27 has been moved to switch closing position the catch arm 38 drops into catch engagement with the pin 39 on said lever and locks the lever in its switch closing position and also lowers the trip arm 35 into tripping relation to a registering trip-screw 40. When the desired quantity of liquid has been delivered to the receptacle 2 the float 7 will have risen a sufficient height in the receptacle for the finger 21 thereon to have moved into engagement with the registering stop 22 and raised the sleeve 19, shaft 10 and head 37 a sufficient distance to effect a raising of the trip arm 35 and a consequent disengagement of the catch arm 38 and pin 39, thereby permitting the switch lever 27 to move to its open position by the action of spring 34. The measured quantity of liquid delivered to the receptacle 22 is discharged therefrom to a receiving receptacle by an opening of the faucet 6. As the float 7 lowers in the receptacle 2 by the discharge of liquid therefrom the catch lever 60 engages the successive projections 59 in its path and communicates unit recording movements to the meter 51 through the rods 58—56 and link.

I wish it understood that my invention is not limited to any specific construction, arrangement or form of the parts, as it is capable of numerous modifications and changes without departing from the spirit of the claims.

Having thus described my invention, what I claim is new and desire to secure by Letters Patent, is—

1. In an apparatus of the class described, a liquid receptacle, a float therein, means operable to deliver liquid to said receptacle, and mechanism having a plurality of stops and selectively adjustable to determine the quantity of liquid delivered to said receptacle and automatically operable by coaction of said float with a selected stop at a predetermined point in its upward movement to stop the delivery of liquid to said receptacle by said means.

2. In an apparatus of the class described, a liquid receptacle, means for delivering a liquid to said receptacle from a source of supply, a float in said receptacle, and mechanism having a rotatable member in said receptacle provided with variously positioned stops said member being manually rotated to place a predetermined stop in position to be engaged by a portion of said float and to coöperate therewith to vertically move said member, said mechanism being operable by a vertical movement of said member to stop the delivery of liquid to the receptacle by said means.

3. In an apparatus of the class described, a liquid receptacle, means operable to deliver liquid to said receptacle from a source of supply, a control for said means, a float in said receptacle having a contact part, a member mounted for rotary and vertical movements in said receptacle and having variously positioned stops adjustable by a rotation of the member to place any one of the stops in register with the contact part of the float, whereby said contact part will engage the registering stop and impart longitudinal movement to the member when the float has been raised a predetermined extent, and means automatically operable by float actuated movements of said member to operate said control to stop the operating of said liquid delivering means.

4. In an apparatus of the class described, a liquid receptacle, means operable to deliver liquid to said receptacle from a source of supply, a control for said means, a float in said receptacle having a contact part, a member mounted for rotary and vertical movements in said receptacle and having variously positioned stops adjustable by a rotation of the member to place any one of the stops in register with the contact part of the float whereby said contact part will engage the registering stop and impart longitudinal movement to the member when the float has been raised a predetermined extent, and means manually operable to control the rotation of said member and automatically operable by float actuated movements of said member to operate said control to stop the delivery of liquid to said receptacle.

5. In an apparatus of the class described, a liquid receptacle, a float in said receptacle, means operable to deliver a liquid to said receptacle from a source of supply and embodying a motor, an electric switch control for said motor normally standing in open position, a control means for said switch manually operable to close the switch and to hold the switch in closed position, and means operable by said float at a predetermined point in a rising movement thereof to act on said control means to permit an opening of the switch, said float actuated means having a plurality of stops adjustable to cause the operating coaction of the float with a selected stop to take place at a predetermined point in a rising movement of said float.

6. In an apparatus of the class described, a liquid receptacle, means operable to deliver liquid to said receptacle from a source of supply, means mounted in and projecting from said receptacle for vertical longitudinal and horizontal rotary movements and having various stops within the receptacle, means for rotating said last means to place a selected stop in operative position, a float in said receptacle adapted at a predetermined point in its rising movement to engage said selected stop and vertically move said movable means, a control for said liquid delivering means, and means actuated by a vertical movement of said movable means to move said control to inoperative position to stop the delivery of liquid to said receptacle.

7. In an apparatus of the class described, a liquid receptacle, means for delivering a liquid to said receptacle from a source of supply embodying an actuating agent and a pipe line, a control for said agent, a valve in said pipe line operable to open and close the same, means for controlling the movements of said control and said valve, a float in said receptacle, and means actuated by said float at a predetermined point in its rising movement to act on said last mentioned means to effect predetermined movements of said control and valve to stop the liquid delivering action of said agent and to close the valve in said pipe line.

8. In an apparatus of the class described, a liquid receptacle, a liquid supply line leading to said receptacle from a source of supply, a normally closed valve in said line, means for forcing liquid through said line into the receptacle, a control for said means, means operable to simultaneously open said valve and place said control in operative position, means urging an opposite action of said last means, catch means for retaining said valve and control operating means in valve opening position, a float in said receptacle, and means actuated by said float at a predetermined point in a rising movement thereof to trip said catch means to release said engaged means.

9. In an apparatus of the class described, a liquid receptacle, a float in said receptacle, a registering mechanism, a movable member disposed vertically in said receptacle and having projections, catch means carried by said float and operable during a descent thereof to successively engage the projections on said member and impart predetermined movements to the member, and means connecting said member and mechanism for causing each movement of the member to operate said mechanism to register a predetermined unit of liquid discharge from said receptacle.

10. In an apparatus of the class described, a liquid receptacle, means for delivering liquid to said receptacle from a source of supply, a float in said receptacle and mechanism having a movable member in said receptacle provided with variously positioned stops, said member being capable of manual movement to place a predetermined stop in position to be engaged by a portion of said float when the float is raised and to coöperate therewith to vertically move said member, said mechanism being operable by a vertical movement of said member to stop the delivery of liquid to the receptacle by said means.

11. In an apparatus of the class described, a liquid receptacle, a float therein, a registering meter, means operable to deliver liquid to said receptacle, mechanism adjustable to determine the quantity of liquid to be delivered to said receptacle, and automatically operable by said float at a predetermined point in its upper movement to stop the delivery of liquid to said receptacle by said means, a movable member disposed in said receptacle and having a plurality of projections, means carried by said float and operable during a descent thereof to successively engage the projections on said member and impart predetermined movements to the member, and means extending through a part of said mechanism and connecting said member and meter for causing each movement of the member to operate said meter to register a predetermined quantity of liquid discharged from said receptacle.

12. In an apparatus of the class described, a liquid receptacle, a float therein, a liquid supply line in communication with said receptacle, a valve in said supply line, and mechanism having a plurality of stops and selectively adjustable to determine the quantity of liquid to be delivered to said receptacle and automatically operable by coaction of said float with a selected stop at a predetermined point in an upward movement of the float to close said valve.

13. In an apparatus of the class described, a liquid receptacle, a float therein, a supply line for said receptacle, a valve in said line, means operable to deliver liquid to the receptacle through said line, and mechanism selectively adjustable to determine in advance the quantity of liquid to be delivered to said receptacle and automatically operable by coaction of said float with a selected part of said mechanism at a predetermined point in an upward movement of the float to stop the liquid delivering action of said means and to simultaneously close said valve.

In testimony whereof, I have hereunto signed my name to this specification.

JOHN H. LONDICK.